US011216070B2

(12) United States Patent
Bae et al.

(10) Patent No.: US 11,216,070 B2
(45) Date of Patent: Jan. 4, 2022

(54) ELECTRONIC DEVICE AND METHOD FOR CONTROLLING ACTUATOR BY UTILIZING SAME

(71) Applicant: Samsung Electronics Co., Ltd., Suwon-si (KR)

(72) Inventors: Yudong Bae, Suwon-si (KR); Jeongseok Lee, Anyang-si (KR); Jaeyoung Huh, Seoul (KR); Donggyu Kim, Seoul (KR); Ilyoung Kim, Suwon-si (KR); Kwonho Song, Suwon-si (KR); Yanghee Lee, Pyeongtaek-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 16/476,993

(22) PCT Filed: Jan. 5, 2018

(86) PCT No.: PCT/KR2018/000273
§ 371 (c)(1),
(2) Date: Jul. 10, 2019

(87) PCT Pub. No.: WO2018/131841
PCT Pub. Date: Jul. 19, 2018

(65) Prior Publication Data
US 2019/0354186 A1 Nov. 21, 2019

(30) Foreign Application Priority Data
Jan. 13, 2017 (KR) .................. 10-2017-0006317

(51) Int. Cl.
G06F 3/01 (2006.01)
G06F 3/14 (2006.01)
(Continued)

(52) U.S. Cl.
CPC ................ *G06F 3/016* (2013.01); *G06F 3/14* (2013.01); *G06F 3/16* (2013.01); *G08B 6/00* (2013.01)

(58) Field of Classification Search
CPC ........ G06F 3/015; G06F 3/016; G06F 3/0346; G06F 3/14; G06F 3/16; G06F 3/165; G08B 6/00
See application file for complete search history.

(56) References Cited

U.S. PATENT DOCUMENTS 8,866,601 B2 10/2014 Cruz-Hernandez et al.
2006/0279537 A1* 12/2006 Kim ........................ G06F 3/016
345/156

(Continued)

FOREIGN PATENT DOCUMENTS

JP 2014154158 A 8/2014
KR 10-2006-0130329 A 12/2006
(Continued)

Primary Examiner — Ram A Mistry
(74) Attorney, Agent, or Firm — Jefferson IP Law, LLP

(57) ABSTRACT

Various embodiments of the present invention relate to a method for controlling an actuator. The present invention can detect a haptic generation event through a sensor unit, check data of an actuator and data of a human receptor stored in a memory in response to the haptic generation event, calculate a driving voltage of the actuator on the basis of the checked data of the actuator and the checked data of the human receptor, and drive the actuator with the calculated driving voltage. Other embodiments are also possible.

15 Claims, 10 Drawing Sheets

(51) Int. Cl.
*G06F 3/16* (2006.01)
*G08B 6/00* (2006.01)

(56) References Cited

U.S. PATENT DOCUMENTS

| | | | |
|---|---|---|---|
| 2009/0210568 A1* | 8/2009 | Peterson | G06F 3/0202 |
| | | | 710/15 |
| 2011/0163985 A1 | 7/2011 | Bae et al. | |
| 2014/0218185 A1 | 8/2014 | Cruz-Hernandez et al. | |
| 2016/0042666 A1* | 2/2016 | Hughes | G09B 21/009 |
| | | | 340/4.12 |
| 2016/0179260 A1 | 6/2016 | Ham et al. | |
| 2018/0183372 A1* | 6/2018 | Li | G06F 3/0414 |

FOREIGN PATENT DOCUMENTS

| | | |
|---|---|---|
| KR | 10-2011-0080316 A | 7/2011 |
| KR | 10-2015-0057568 A | 5/2015 |
| KR | 10-2016-0080751 A | 7/2016 |

\* cited by examiner

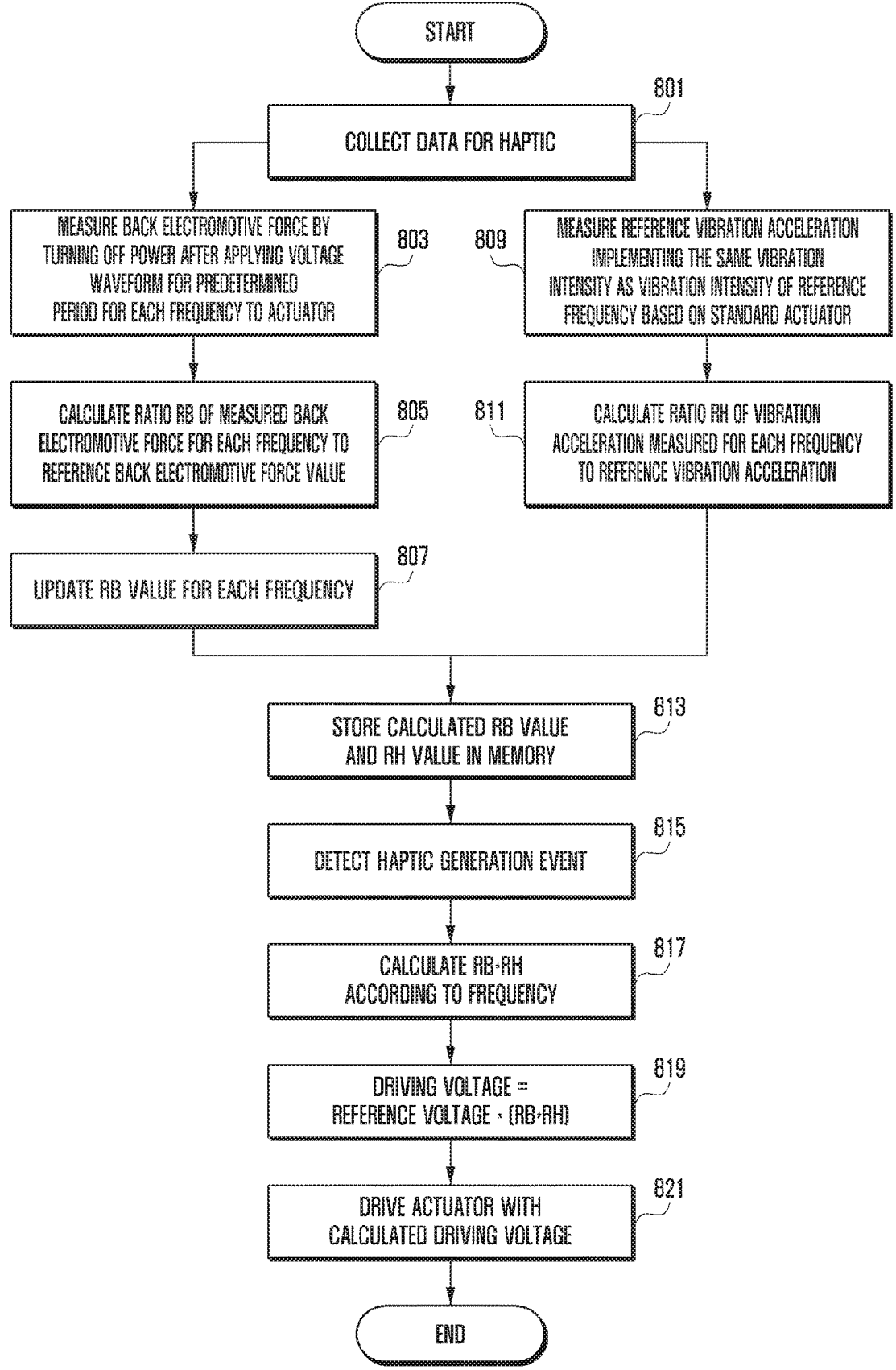

ELECTRONIC DEVICE AND METHOD FOR CONTROLLING ACTUATOR BY UTILIZING SAME

TECHNICAL FIELD

Various embodiments of the disclosure relate to a method for controlling an actuator provided in an electronic device using the electronic device.

BACKGROUND ART

In the case of receiving a notification signal, a portable electronic device may generate haptic vibration in order to notify a user of the received notification signal. For example, in the case of receiving an SMS message or a phone call, a portable electronic device may generate haptic vibration through an actuator (e.g., vibration motor) provided in the portable electronic device. Here, the actuator corresponds to a driving device operating a machine using a power, and hereinafter, it may be one of motors for generating haptic vibration in the electronic device. The actuator provided in the portable electronic device has its own driving frequencies, and the haptic vibration may have a different intensity in accordance with each driving frequency.

DISCLOSURE OF INVENTION

Technical Problem

In general, an actuator for generating haptic vibration may have a determined resonant frequency, and the haptic vibration with the highest intensity may be generated at the resonant frequency. That is, the actuator may generate the haptic vibration with a different intensity in accordance with each frequency. For example, if a constant voltage is applied to the electronic device provided with the actuator, the haptic vibration may have the highest intensity in the resonant frequency region, and the intensity of the haptic vibration may be abruptly weakened as going away from the resonant frequency region.

In addition, human beings may sense haptic vibration with a different vibration intensity. Specifically, a human receptor, such as pacini corpuscles, exists in a human body, and the human receptor may have a different body sensitivity for each frequency (hereinafter, it means 'the characteristic of the human receptor). For example, in the frequency range of about 200 to 250 Hz, the human receptor may have a small change of sensitivity. That is, in the frequency range of about 200 to 250 Hz, a user may sense the haptic vibration with a perfect intensity. However, if the frequency region in which the actuator is driven becomes lower than about 200 to 250 Hz (e.g., about 180 Hz or less) or becomes higher than about 200 to 250 Hz (e.g., about 260 Hz or more), the sensitivity of the human receptor is lowered, and thus a user may sense that the intensity of the haptic vibration is weak.

Various embodiments of the disclosure can adjust a driving voltage of an actuator that is driven in a broadband frequency region so as to constantly feel the intensity of haptic vibration for each frequency. Various embodiments of the disclosure can provide a method for configuring a driving voltage of an actuator for each frequency in consideration of both the characteristic of the actuator for each frequency and the characteristic of a human receptor for each frequency.

Solution to Problem

According to various embodiments of the disclosure, an electronic device includes an actuator; a sensor circuitry; a memory; and a processor electrically connected to the actuator, the sensor circuitry, and the memory, wherein the processor is configured to detect a haptic generation event through the sensor circuitry, identify data of the actuator and data of a human receptor stored in the memory in response to the haptic generation event, calculate a driving voltage of the actuator based on the identified data of the actuator and the identified data of the human receptor, and drive the actuator with the calculated driving voltage.

According to various embodiments of the disclosure, a method for controlling an actuator includes detecting a haptic generation event through a sensor circuitry; identifying data of the actuator and data of a human receptor stored in a memory in response to the haptic generation event; calculating a driving voltage of the actuator based on the identified data of the actuator and the identified data of the human receptor; and driving the actuator with the calculated driving voltage.

Advantageous Effects of Invention

According to the various embodiments of the disclosure, it is possible to determine the driving voltage of the actuator in consideration of both the characteristic of the actuator for each frequency and the characteristic of the human receptor for each frequency. According to the various embodiments of the disclosure, because the driving voltage of the actuator is determined in consideration of both the characteristic of the actuator for each frequency and the characteristic of the human receptor for each frequency, it is possible to adjust the intensity of the haptic vibration and to transfer the haptic vibration having various intensities to the user. According to the various embodiments of the disclosure, it is possible to adjust the intensity of the haptic vibration in accordance with user's configuration.

BRIEF DESCRIPTION OF DRAWINGS

FIG. 8 is a flowchart explaining a method for determining a driving voltage of an actuator based on a back electromotive force value of the actuator and a vibration acceleration for a human receptor according to various embodiments of the disclosure.

MODE FOR THE INVENTION

Figure 1:
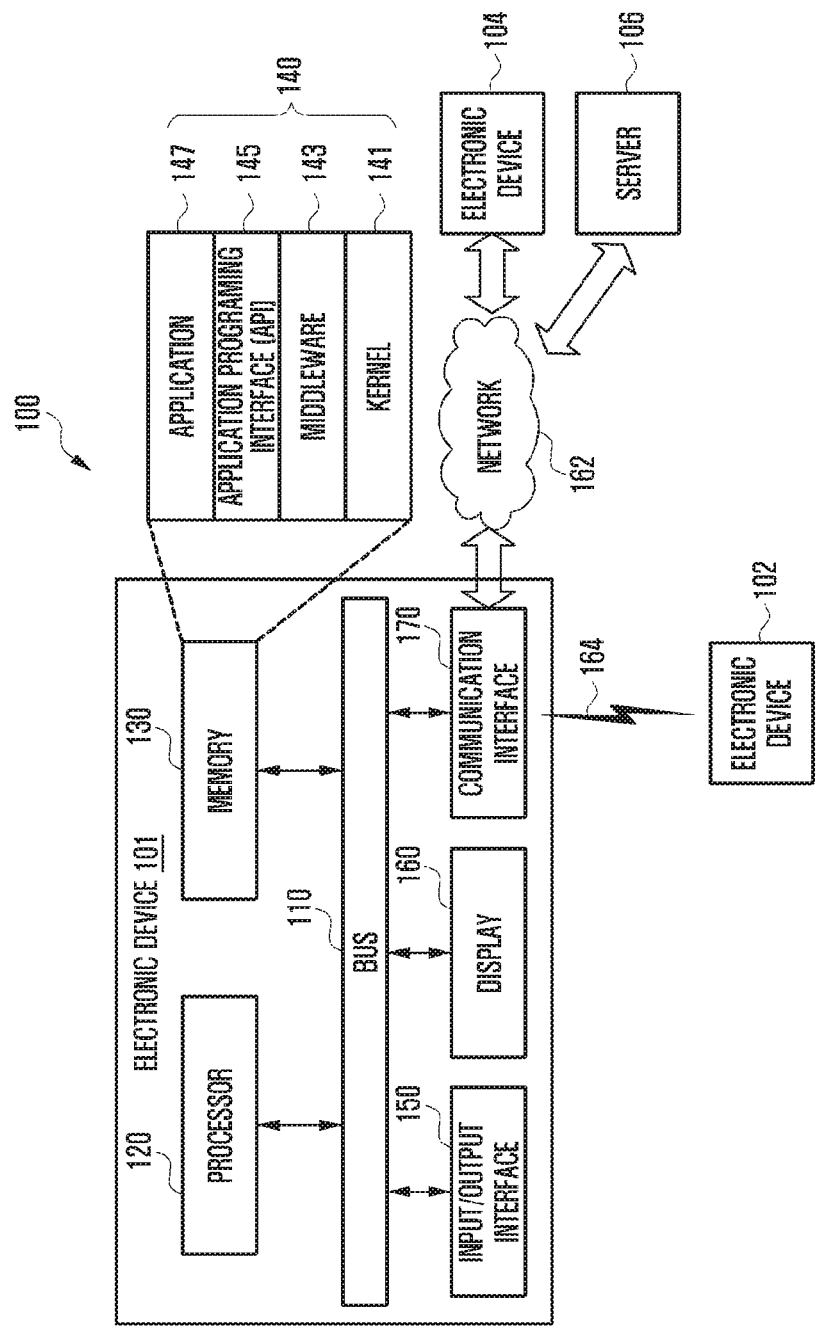
FIG. 1 is a diagram illustrating an electronic device in a network environment according various embodiments of the disclosure.

Hereinafter, the present disclosure is described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

It should be appreciated that various embodiments of the present disclosure and the terms used therein are not intended to limit the technological features set forth herein to particular embodiments and include various changes, equivalents, or replacements for a corresponding embodiment. Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

An electronic device according to various embodiments of the present invention may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head-Mounted-Device (HMD), such as electronic glasses, electronic clothes, an electronic bracelet, an electronic necklace, an electronic appcessary, an electronic tattoo, and a smart watch).

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), which are equipped with an antenna. The electronic device according to various embodiments of the present invention may also be a combination of the devices listed above. Further, the electronic device according to various embodiments of the present disclosure may be a flexible device. It is apparent to those skilled in the art that the electronic device according to various embodiments of the present invention is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

FIG. 1 illustrates a network environment 100 including an electronic device 101 according to various embodiments of the present disclosure.

Referring to FIG. 1, the electronic device 101, 102, 104 may connect to the server 106 via the network 162 or short-wireless communication 164.

The electronic device 101 may include a bus 110, a processor 120, a memory 130, an input/output interface 150, a display 160, and a communication interface 170. According to some embodiments, at least one of the above described components may be omitted from the electronic device 101 or another component may be further included in the electronic device 101. The bus 110 may be a circuit connecting the above described components 120, 130, and 150~170 and transmitting communications (e.g., control messages and/or data) between the above described components. The processor 120 is capable of including one or more of the following: a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS). The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests. The API 145 refers to an interface configured to allow the application programs 147 to control functions provided by the kernel 141 or the middleware 143. The API 145 is capable of including at least one interface or function (e.g., instructions) for file control, window control, image process, text control, or the like. The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-wireless communication 164. Short-wireless communication 164 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
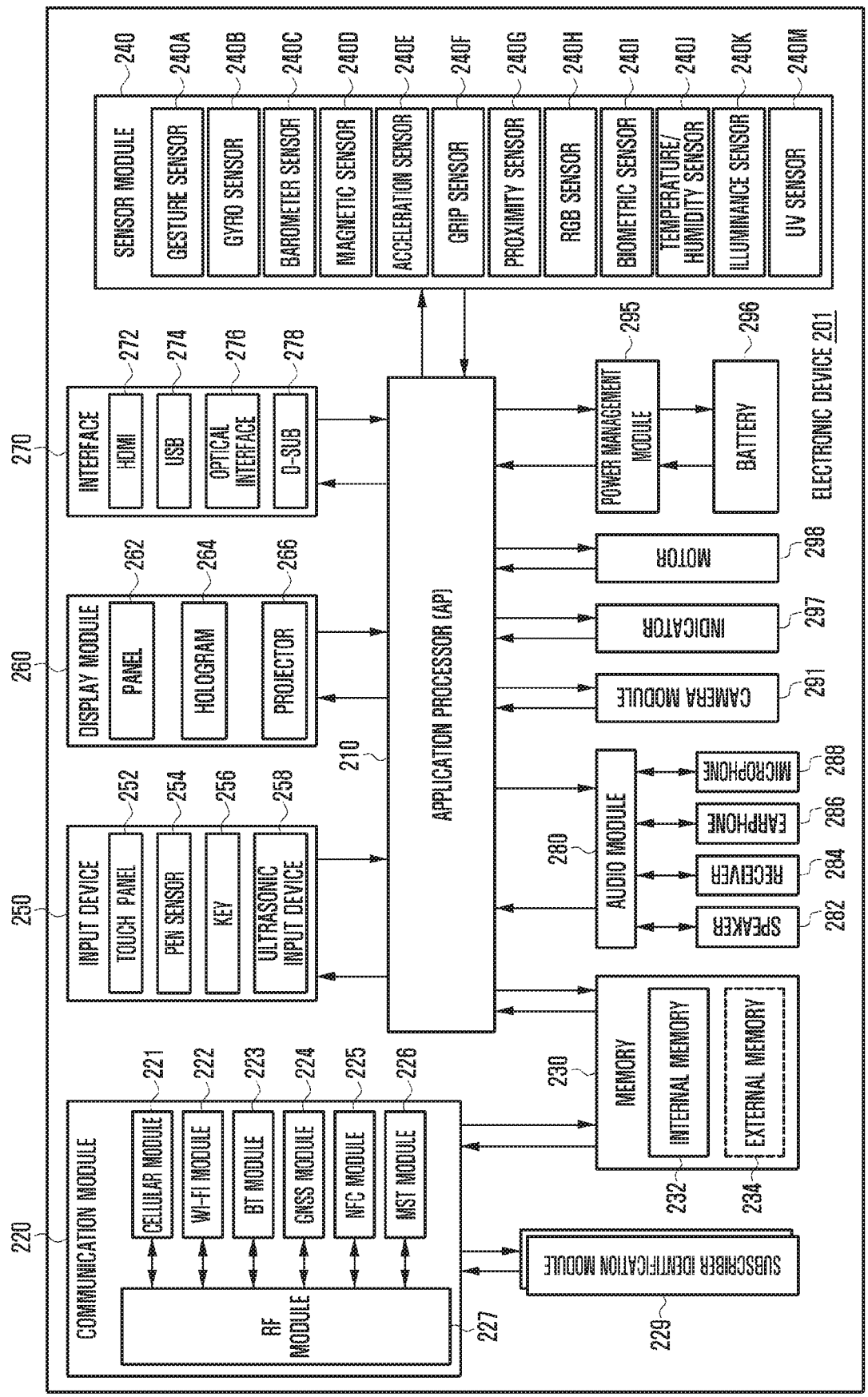
FIG. 2 is a block diagram of an electronic device according to various embodiments of the disclosure.

FIG. 2 is a detailed block diagram showing a configuration of an electronic device 201 according to various embodiments. For example, the electronic device 201 is capable of including part or all of the components in the electronic device 101 shown in FIG. 1. The electronic device 201 is capable of including one or more processors 210 (e.g., Application Processors (APs)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 is capable of including a cellular module 221, WiFi module 223, Bluetooth (BT) module 225, GNSS module 227 (e.g., a GPS module, Glonass module, Beidou module or Galileo module), NFC module 228, and Radio Frequency (RF) module 229. The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 221 is also capable of including a communication processor (CP). Each of the WiFi module 223, the BT module 225, the GNSS module 227, and the NFC module 228 is capable of including a processor for processing data transmitted or received through the corresponding module. According to embodiments, at least part of the cellular module 221, WiFi module 223, BT module 225, GNSS module 227, and NFC module 228 (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module. The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc. The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266. The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc. The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc. The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
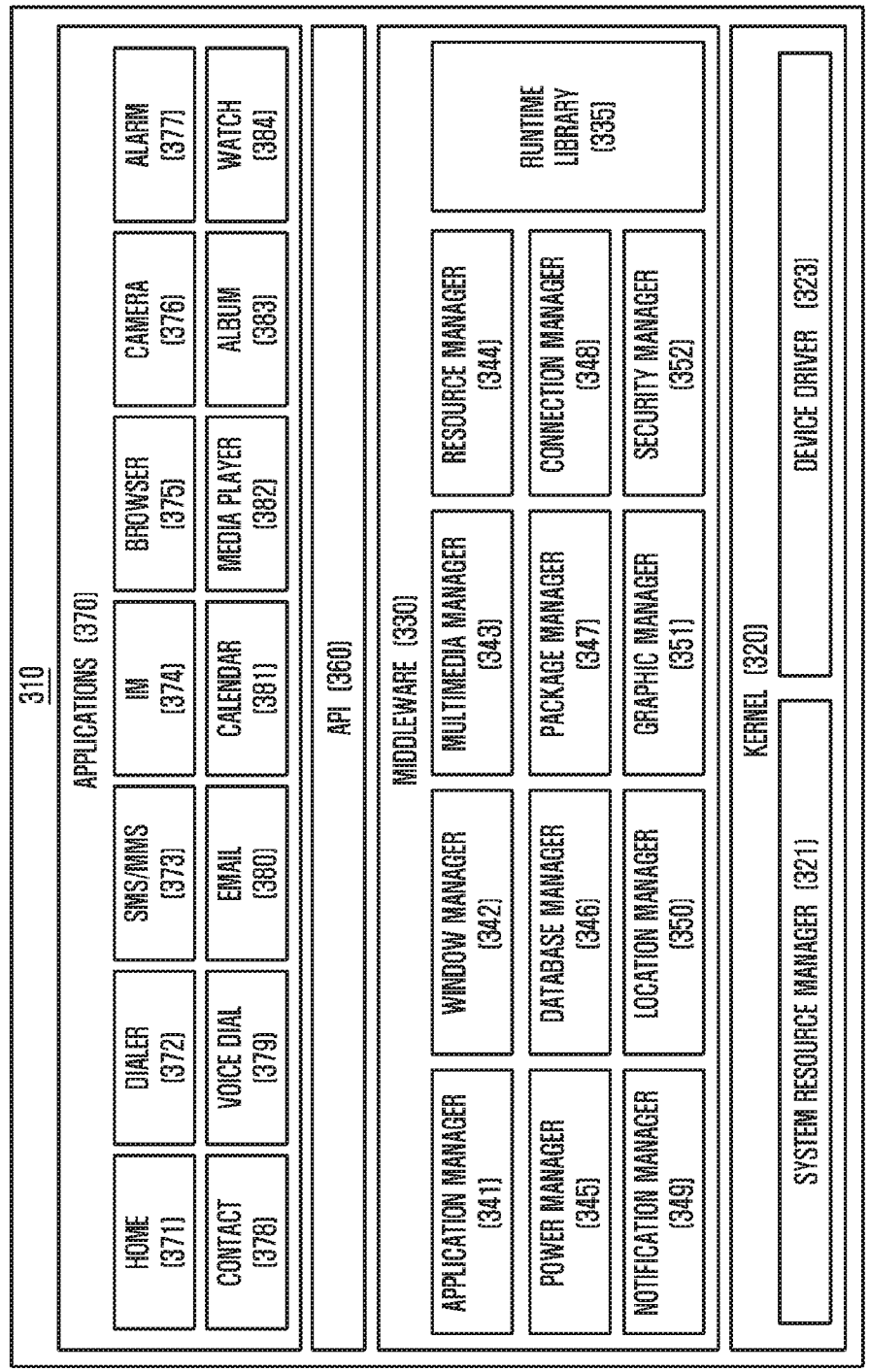
FIG. 3 is a block diagram of a program module according to various embodiment of the disclosure.

FIG. 3 is a block diagram of a programming module according to various embodiments. According to an embodiment, the program module 310 (e.g., program module 140 shown in FIG. 1) is capable of including an operation system (OS) for controlling resources related to the electronic device (e.g., electronic device 101) and/or various applications (e.g., application programs 147 shown in FIG. 1) running on the OS. The OS may be Android, iOS, Windows, Symbian, Tizen, Bada, etc. The program module 310 is capable of including a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like. The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370. The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function. The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components. The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, diary 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.). According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices. For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user. The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc. According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems. According to various embodiments, at least part of the program module 310 can be implemented with software, firmware, hardware, or any combination of two or more of them. At least part of the program module 310 can be implemented (e.g., executed) by a processor (e.g., processor 210). At least part of the programing module 310 may include modules, programs, routines, sets of instructions or processes, etc., in order to perform one or more functions.

Figure 4:
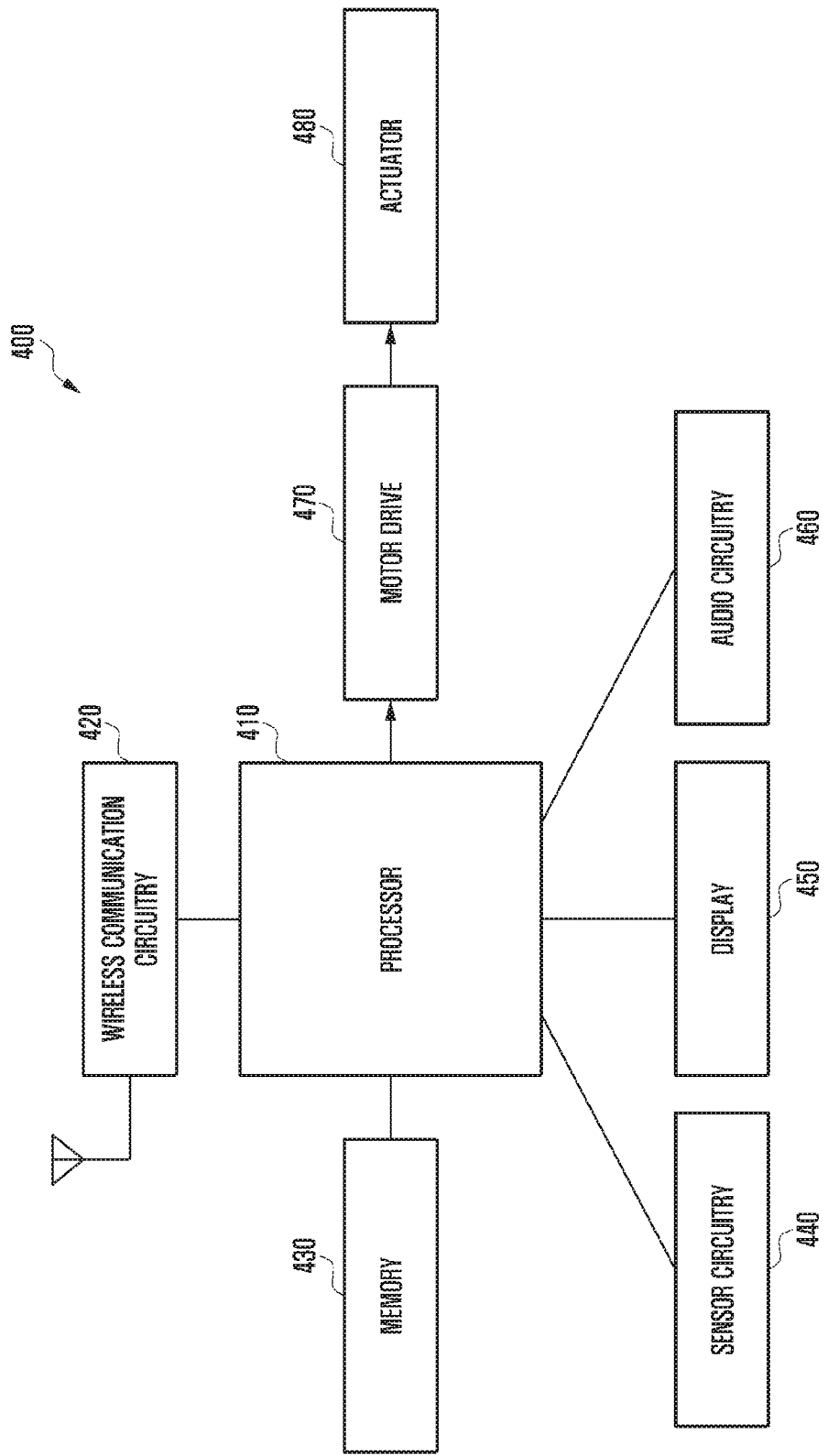
FIG. 4 is a block diagram of an electronic device provided with an actuator according to various embodiments of the disclosure.

FIG. 4 is a block diagram of an electronic device provided with an actuator according to various embodiments of the disclosure.

With reference to FIG. 4, an electronic device 400 (electronic device 101 of FIG. 1) according to various embodiments of the disclosure may include a processor 410, a wireless communication circuitry 420, a memory 430, a sensor circuitry 440, a display 450, an audio circuitry 460, a motor drive 470, and an actuator 480. The processor 410 may control a plurality of hardware or software constituent elements connected to the processor 410 through driving of the operating system or an application program, and it may perform various kinds of data processing and operations. The processor 410 may be implemented, for example, a system on chip (SoC).

The processor 410 of the electronic device 400 may be connected to another electronic device through the wireless communication circuitry 420 (communication module 220 of FIG. 2) to exchange data with the other electronic device.

The memory 430 (memory 230 of FIG. 2) of the electronic device 400 may store therein instructions executed by the processor 410. According to various embodiments of the disclosure, data of the actuator and data of a human receptor may be stored in the memory 430. The memory 430 according to various embodiments of the disclosure may store a mapping table for driving voltages of the actuator configured based on the data of the actuator and the data of the human receptor. The data of the actuator may include driving voltage values for driving the actuator for respective frequencies. The data of the human receptor may include intensity information of haptic vibration that a user feels through the human receptor.

The sensor circuitry 440 (sensor module 240 of FIG. 2) of the electronic device 400 may detect a haptic generation event. For example, the sensor circuitry 440 may detect a user's touch input or a pressure in accordance with the touch input, and it may calculate the detected input value as a sensing value. If the sensing value satisfies a specific condition (exceeds a threshold value), the processor may identify that a haptic generation event has occurred, and it may operate to generate haptic vibration.

The display 450 (display module 260 of FIG. 2) of the electronic device 400 may detect the haptic generation event, such as a collision between graphic objects. If the display 450 identifies the collision between the graphic objects, the processor 410 may identify whether the haptic generation event has occurred.

The audio circuitry 460 (audio module 280 of FIG. 2) of the electronic device 400 may receive an audio signal (or metadata). If the audio signal received from the audio circuitry 460 satisfies a specific configured condition, the processor 410 may identify that the haptic generation event has occurred.

The motor drive 470 of the electronic device 400 may drive a motor, such as the actuator 480. The actuator 480 is a driving device operating a machine using a power, and according to various embodiments of the disclosure, the actuator 480 may be a motor that generates haptic vibration. The processor 410 according to various embodiments of the disclosure may control the motor drive 470 to drive the actuator 480.

Various embodiments of the disclosure may detect the haptic generation event using the sensor circuitry 440, the display 450, and the audio circuitry 460, identify data of the actuator 480 and data of the human receptor if the haptic generation event occurs, calculate a voltage for driving the actuator 480 based on the above-described data, and generate the haptic vibration through driving of the actuator with the calculated voltage.

According to various embodiments of the disclosure, an electronic device may include an actuator; a sensor circuitry; a memory; and a processor electrically connected to the actuator, the sensor circuitry, and the memory, wherein the processor is configured to detect a haptic generation event through the sensor circuitry, identify data of the actuator and data of a human receptor stored in the memory in response to the haptic generation event, calculate a driving voltage of the actuator based on the identified data of the actuator and the identified data of the human receptor, and drive the actuator with the calculated driving voltage.

According to various embodiments of the disclosure, the processor of the electronic device may be configured to collect the data of the actuator and the data of the human receptor for haptic vibration and to store the collected data of the actuator and the collected data of the human receptor in the memory.

According to various embodiments of the disclosure, the processor of the electronic device may be configured to identify a reference voltage at a resonant frequency based on the actuator, to apply the reference voltage to the actuator for each frequency, to acquire the data of the actuator for the haptic vibration, and to store the acquired data of the actuator in the memory.

According to various embodiments of the disclosure, the processor of the electronic device may be configured to collect the data of the human receptor for each frequency using a standard actuator, and to store the collected data of the human receptor in the memory.

According to various embodiments of the disclosure, the processor of the electronic device may be configured to apply a voltage for a predetermined period to the actuator for each frequency based on the actuator, to measure a back electromotive force generated if the voltage is blocked, to calculate a ratio of the measured back electromotive force to a reference back electromotive force, and to store the ratio of the calculated back electromotive force in the memory.

According to various embodiments of the disclosure, the processor of the electronic device may be configured to apply a voltage for a predetermined period to the actuator for each frequency based on the actuator, to measure a displacement of a vibrator using a hall sensor in the case of applying the voltage, to calculate a ratio of the measured displacement of the vibrator to a reference displacement, and to store the calculated ratio of the displacement in the memory.

According to various embodiments of the disclosure, the processor of the electronic device may be configured to measure a reference vibration acceleration implementing the same intensity as a vibration intensity of a reference frequency using a standard actuator, to calculate a ratio between the vibration acceleration measured for each frequency and the reference vibration acceleration, and to store the calculated ratio of the vibration acceleration in the memory.

According to various embodiments of the disclosure, the processor of the electronic device may be configured to calculate the driving voltage for driving the actuator based on the calculated back electromotive force ratio, the calculated displacement ratio, or the calculated acceleration ratio, and to drive the actuator with the calculated driving voltage.

According to various embodiments of the disclosure, the data of the human receptor may be data quantifying a user's feeling degree for each frequency with respect to the vibration intensity of the haptic vibration generated through the actuator.

According to various embodiments of the disclosure, the processor of the electronic device may be configured to adjust the driving voltage of the actuator by user's configuration.

According to various embodiments of the disclosure, the electronic device may further include a display and an audio circuitry, wherein the processor may be configured to detect the haptic generation event based on the display and the audio circuitry.

According to various embodiments of the disclosure, the processor of the electronic device may be configured to compare the calculated driving voltage of the actuator with a configured threshold value, and to drive the actuator with the driving voltage determined based on the result of the comparison, wherein the threshold value may be the driving voltage of the actuator corresponding to a vibration intensity configured by a user for each frequency.

Figure 5:
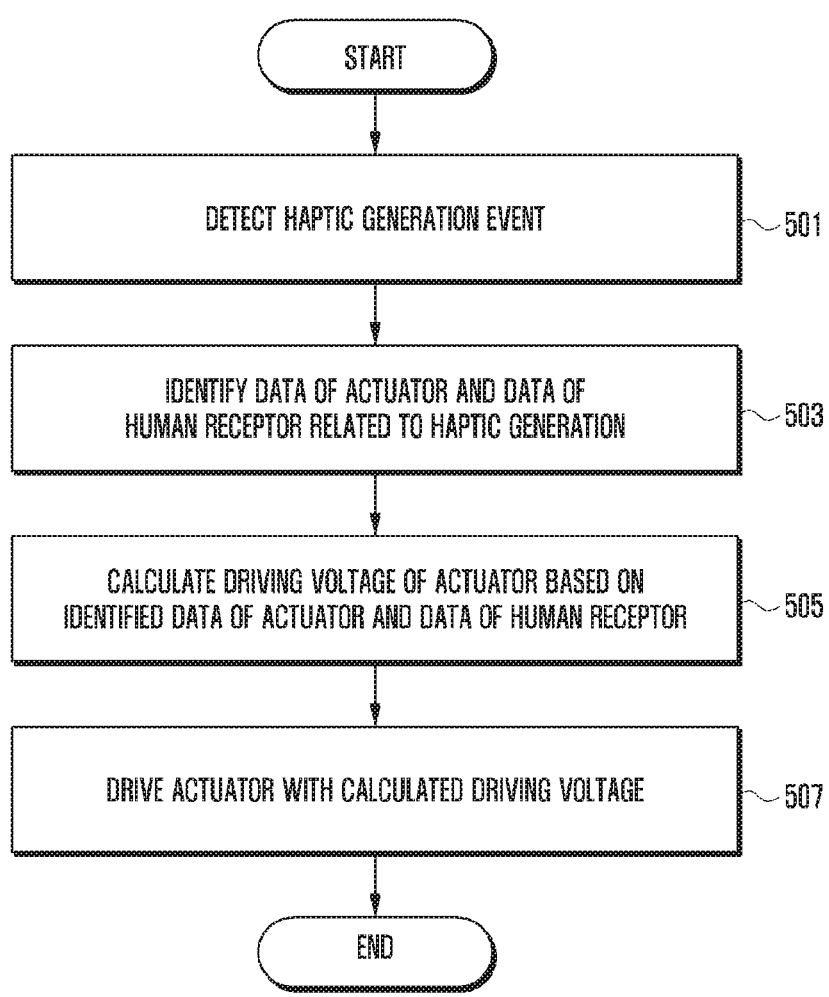
FIG. 5 is a flowchart explaining a method for determining a driving voltage of an actuator based on data of the actuator and data of a human receptor according to various embodiments of the disclosure.

FIG. 5 is a flowchart explaining a method for determining a driving voltage of an actuator based on data of the actuator and data of a human receptor according to various embodiments of the disclosure.

With reference to FIG. 5, at operation 501, the processor 410 of the electronic device (electronic device 400 of FIG. 4) according to various embodiments of the disclosure may detect a haptic generation event. For example, if a notification signal (e.g., text message reception notification, call request signal reception notification, or alarm signal) is received, the processor 410 may detect the occurrence of the haptic generation event. The processor 410 may receive a user's touch input or a touch pressure corresponding to the touch input through the sensor circuitry 440, and it may determine whether the haptic generation event has occurred. The processor 410 may detect an event, such as a collision between graphic objects, through the display 450, and it may determine whether the haptic generation event has occurred. Further, the processor 410 may receive an audio signal (or metadata) through the audio circuitry 460, and if the audio signal satisfies a specific configured condition, the processor 410 may detect that the haptic generation event has occurred.

According to various embodiments of the disclosure, if the processor 410 detects the haptic generation event at operation 501, the processor 410 may identify data of the actuator and data of a human receptor related to the haptic generation at operation 501.

If a constant voltage is applied to the actuator, the haptic vibration may be generated with a different vibration intensity for each frequency. For example, the actuator may have a resonant frequency, and in the resonant frequency region, the haptic vibration with the highest intensity may be measured in the resonant frequency region. The vibration intensity of the haptic vibration generated by the actuator may be abruptly weakened as going away from the resonant frequency region. If a constant voltage is applied to the actuator, the actuator may generate the haptic vibration with a different vibration intensity for each frequency. The data of the actuator may include information on the vibration intensity of the haptic vibration generated for each frequency.

Further, there is a human receptor, such as pacini corpuscles, in a human body, and the human receptor may have a different sensitivity for each frequency. Data of the human receptor may include information on the sensitivity differently measured for each frequency. As described above, the data of the actuator and the data of the human receptor may be stored in the form of a table in the memory 430 of the electronic device 400. The data of the actuator and the data of the human receptor may be pre-stored in the memory 430 regardless of the haptic generation event.

At operation 503, the processor 410 may load and identify the data of the actuator and the data of the human receptor stored in the memory 430.

At operation 505, the processor 410 may calculate the driving voltage of the actuator based on the identified data of the actuator and the identified data of the human receptor. In general, the actuator may generate the haptic vibration with the maximum vibration intensity in the resonant frequency region, and as going away from the resonant frequency region, the vibration intensity of the haptic vibration may become lowered. According to various embodiments of the disclosure, the driving voltage of the actuator may be calculated so that the user can equally feel the vibration intensity even in the case of going away from the resonant frequency region.

At operation 507, the processor 410 may drive the actuator with the calculated driving voltage. The processor 410 drives the actuator to generate the haptic vibration, and the user can feel the same vibration intensity with respect to the generated haptic vibration.

Figure 6:
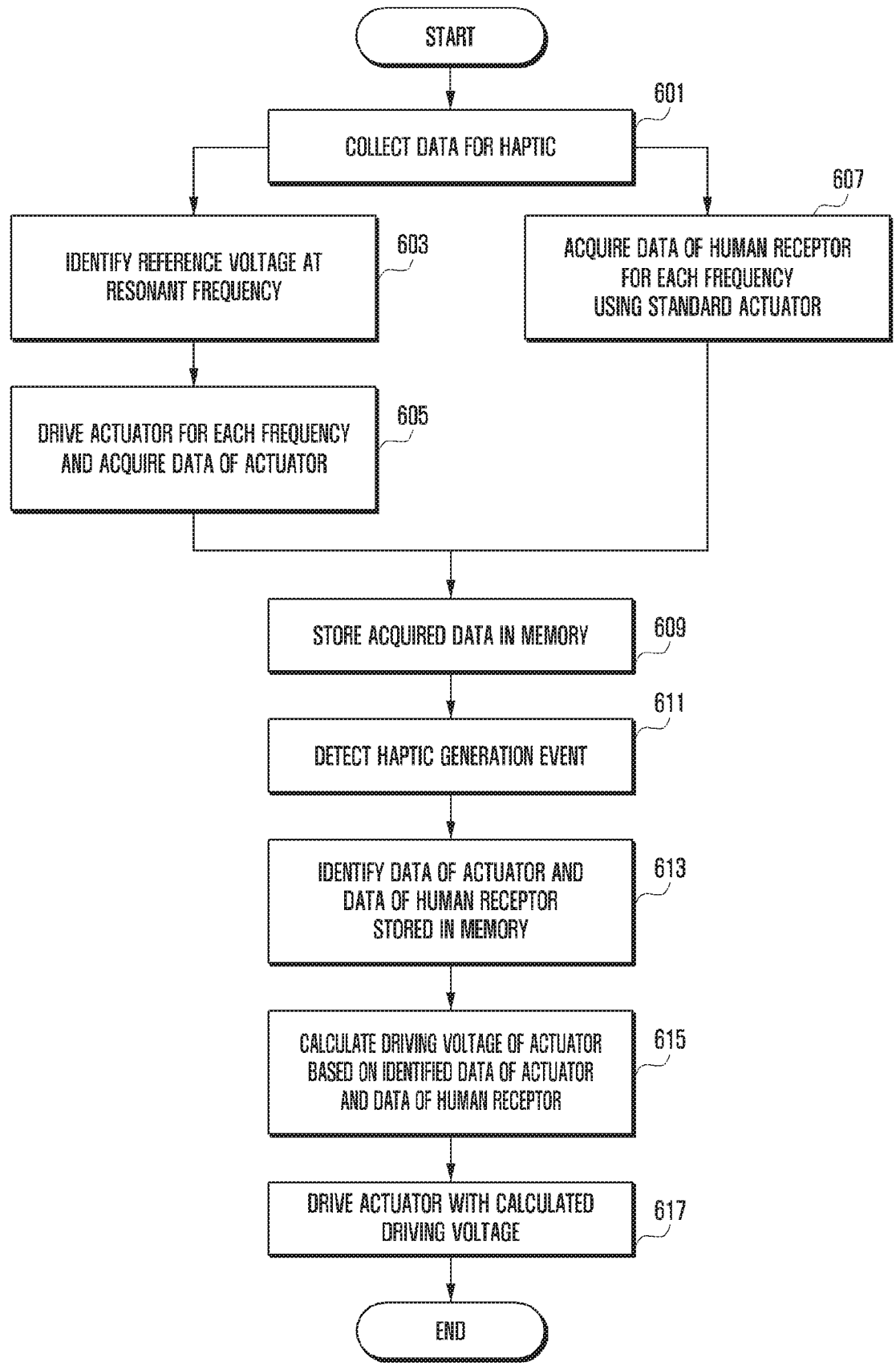
FIG. 6 is a flowchart explaining in more detail a method for determining a driving voltage of an actuator based on data of the actuator and data of a human receptor according to various embodiments of the disclosure.

FIG. 6 is a flowchart explaining in more detail a method for determining a driving voltage of an actuator based on data of the actuator and data of a human receptor according to various embodiments of the disclosure.

With reference to FIG. 6, at operation 601, the processor 410 of the electronic device 400 according to various embodiments of the disclosure may collect haptic data. For example, the processor 410 may collect data corresponding to the actuator for generating haptic vibration, or it may collect data corresponding to the human receptor that feels the haptic vibration.

Specifically, at operation 603, the processor 410 may identify a reference voltage at a resonant frequency corresponding to each actuator. Each actuator may have a predetermined resonant frequency, and the haptic vibration with the maximum intensity may be generated at the resonant frequency. At operation 605, the processor 410 may apply the identified reference voltage to the actuator to drive the actuator for each frequency. By driving the actuator for each frequency, the processor 410 may acquire the data of the actuator (haptic data).

At operation 607, the processor 410 may acquire the data of the human receptor for each frequency using a standard actuator. In general, the standard actuator may be an actuator built in the electronic device 400. Even the standard actuator may have a predetermined resonant frequency, and the processor 410 may identify a reference voltage for the standard actuator. The processor 410 may drive the standard actuator for each frequency, and it may acquire the data of the human receptor that a user feels.

At operation 609, the processor 410 may store the data of the actuator and the data of the human receptor in the memory 430. According to various embodiments of the disclosure, the data of the actuator and the data of the human receptor may be stored in the memory 430 in the form of a mapping table.

Because operations 611 to 617 are similar to operations 501 to 507 as described above, the explanation thereof will be summarized. At operations 601 to 609, the electronic device 400 may be in a state where the data of the actuator and the data of the human receptor are stored in the memory 430. At operation 611, the processor 410 may detect a haptic generation event, and in response to the haptic generation event, the processor 410, at operation 613, may identify the data of the actuator and the data of the human receptor stored in the memory 430. At operation 615, the processor 410 may calculate the driving voltage of the actuator based on the identified data of the actuator and the identified data of the human receptor.

For example, the processor 410 may identify the intensity of the haptic vibration generated for each frequency based on the data of the actuator, and it may identify the intensity of the haptic vibration that the user can feel for each frequency based on the data of the human receptor. The processor 410 may calculate the driving voltage for driving the actuator based on the data as described above. The processor 410 may determine the driving voltage so that the same vibration force (intensity of haptic vibration) is sensed for each frequency in consideration of the vibration intensity (response curve) of the actuator for each frequency and the vibration intensity (sensing characteristic) of the human receptor in a skin for each frequency.

TABLE 1

| Frequency | Vibration intensity by motor (updatable) | Human sensitivity by receptor (fixed) | Scale factor (updatable) |
|---|---|---|---|
| f1 | Intensity(@f1) | Sensitivity(@f1) | Sc(@f1) |
| f2 | Intensity(@f2) | Sensitivity(@f2) | Sc(@f2) |
| ... | ... | ... | ... |
| fn | Intensity(@fn) | Sensitivity(@fn) | Sc(@fn) |

Table 1 as above illustrates the vibration intensity of an actuator for each frequency and the vibration intensity of a human receptor sensed for each frequency.

Table 1 as above corresponds to a mapping table composed of the vibration intensity of an actuator (vibration intensity by motor) for each frequency (f1, f2, ..., fn), the vibration intensity of a human receptor (human sensitivity by receptor) for each frequency, and a scale factor. Here, the scale factor corresponds to a value reflecting the change characteristic of a vibration force for each actuator driving voltage. For example, even if the driving voltage is increased, the vibration force has a small increment at a driving frequency that is lower than the resonant frequency, and the vibration force has a large increment in accordance with the change of the driving voltage at a driving frequency that is higher than the resonant frequency. The scale factor may be a numerical value in consideration of the increment of the vibration force which differs for each frequency. The scale factor of an ideal actuator may be "1".

The processor according to various embodiments may calculate the driving voltage of the actuator based on the data of Table 1 as described above.

Driving voltage$(@fi)$=[sensitivity$(@fi)$/intensity$(@fi)$]* $Sc(@fi)$*[intensity$(@fo)$/sensitivity$(@fo)$]* standard voltage        Mathematical expression 1

The processor according to various embodiments may calculate the driving voltage of the actuator in accordance with the above-described equation.

At operation 617, the processor 410 may drive the actuator with the calculated driving voltage. According to various embodiments, the driving voltage is determined so that the user can feel the same vibration force (haptic vibration intensity) for each frequency, and the actuator can be driven with the determined driving voltage.

Figure 7A:
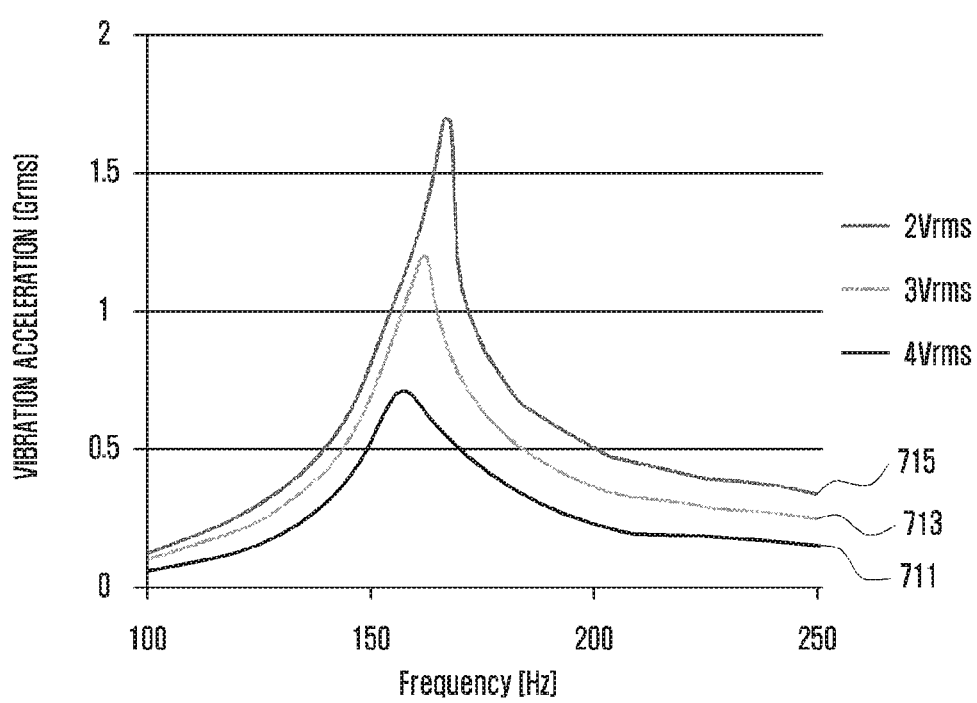
FIG. 7A is an exemplary diagram illustrating a vibration intensity with respect to a driving voltage of an actuator according to various embodiments of the disclosure.
Figure 7B:
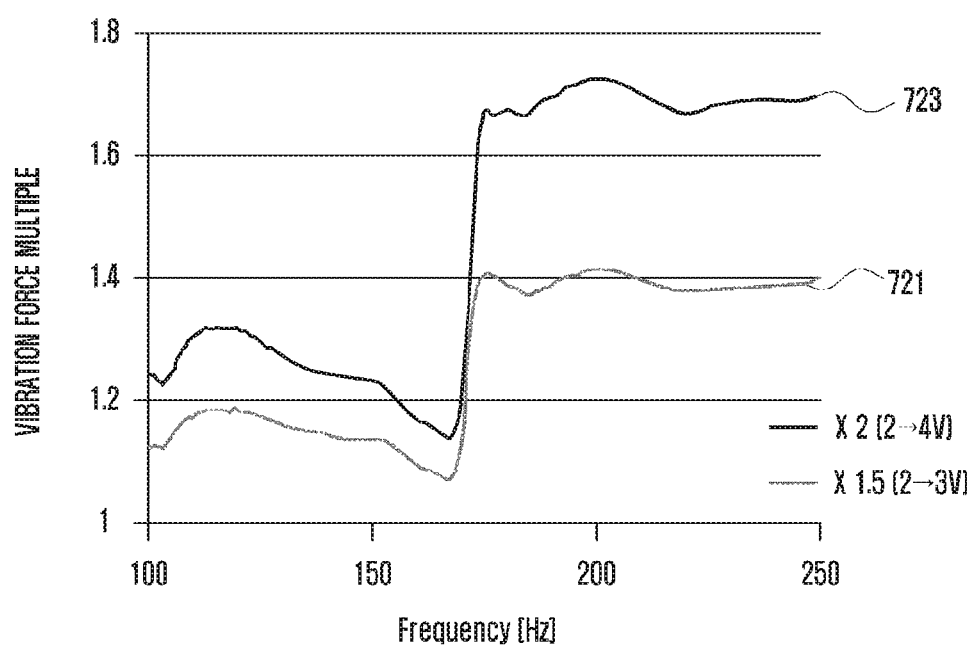
FIG. 7B is an exemplary diagram illustrating a vibration intensity with respect to a driving voltage of an actuator according to various embodiments of the disclosure.

FIGS. 7A and 7B are exemplary diagrams illustrating the vibration intensity with respect to the driving voltage of an actuator according to various embodiments of the disclosure.

FIG. 7A is a graph illustrating that the vibration force generated through the actuator is increased if the driving voltage applied to the actuator is heightened. The actuator may have a different vibration intensity for each frequency, and the maximum vibration intensity may be generated at the resonant frequency region.

With reference to FIG. 7A, it can be identified that the intensity of vibration generated by the actuator is increased as the driving voltage is heightened from 2 Vrms to 4 Vrms based on the same frequency. The vibration intensity may have the maximum increment in a resonant frequency region (e.g., 160 to 180 Hz).

FIG. 7B is a graph illustrating the intensity of vibration (vibration force) generated by the actuator if the driving voltage is increased 1.5 times (3V) and two times (4V) a reference voltage (e.g., 2V) based on the same frequency.

With reference to FIG. 7B, if the driving voltage is increased in a frequency region (e.g., first region) that is lower than the resonant frequency (e.g., 160 to 180 Hz) of the actuator, the vibration force may have an increment that is smaller than an increment of the vibration force in a frequency region (e.g., second region) that is higher than the resonant frequency of the actuator. If the driving voltage is increased in the frequency region that is higher than the resonant frequency of the actuator, the vibration force may have an increment that is larger than the increment of the vibration force in the first region. Here, a scale factor may be calculated based on the increment of the driving voltage and the increment of the vibration force. For example, in the case of driving the actuator with a voltage (3V) that is increased 1.5 times the reference voltage (2V), the increment of the vibration force in the first region may be equal to or smaller than 1.2 times the vibration force, and the increment of the vibration force in the second region may be about 1.4 times the vibration force. That is, it can be identified that the driving voltage should be heightened 1.5 times in order to heighten the vibration force 1.4 times in the second region (frequency region that is higher than the resonant frequency). The scale factor corresponding to the first region may be 1.5/1.2 (=1.25), and the scale factor corresponding to the second region may be 1.5/1.4. The scale factor of an ideal actuator may be 1.

The processor 410 according to various embodiments may apply a different driving voltage of the actuator for each frequency so that a user can feel the same vibration force.

FIG. 8 is a flowchart explaining a method for determining a driving voltage of an actuator based on a back electromotive force value of the actuator and a vibration acceleration for a human receptor according to various embodiments of the disclosure.

According to various embodiments of the disclosure, data (e.g., back electromotive force (back EMF) value) of the actuator and data (e.g., vibration acceleration) of the human receptor may be acquired using a circuit built in the electronic device. For example, if a voltage waveform for a predetermined period is applied to the actuator and power is turned off, the back EMF may be generated in the actuator by inertia. The generated back EMF may be the actuator vibration force just before the actuator is turned off. The processor 410 may acquire the data of the actuator based on the back EMF.

According to various embodiments of the disclosure, a displacement value may be measured using a hall sensor built in the electronic device, and the data of the actuator may be acquired based on the measured displacement value. In a method for acquiring the data of the actuator using the back EMF, it is essential to turn off the power being applied to the actuator, whereas in a method for acquiring the data of the actuator using the displacement value, it is possible to measure the displacement value even in a situation where the actuator is being driven.

With reference to FIG. 8, at operation 801, the processor 410 of the electronic device 400 may collect haptic data. The processor 410 according to various embodiments may collect the data of the actuator and the data of the human receptor using the circuit built in the electronic device.

At operation 803, the processor 410 may measure the back EMF for the actuator by turning off the power after applying the voltage waveform having the predetermined period for each frequency to the actuator. If the power is turned off in a state where the voltage is applied to the actuator, the back EMF may be generated in the actuator by inertia. The processor 410 may measure the generated back EMF.

At operation 805, the processor 410 may calculate a ratio Rb of the measured back EMF to a reference back EMF corresponding to a reference voltage waveform (e.g., back EMF at a resonant frequency). A multiple factor Rb in accordance with the characteristic of the actuator may be obtained by the ratio Rb (reference value/measured value for each frequency>1) between the back EMF for each frequency and the reference back EMF measured at the resonant frequency. The processor 410 may store the calculated ratio value Rb in the memory 430 in the form of a table, and at operation 807, it may update the ratio value Rb for each frequency.

At operation 809, the processor 410 may measure a vibration acceleration (or vibration displacement) implementing the same vibration intensity as the vibration intensity of a reference frequency based on a standard actuator. The processor 410 may measure the vibration acceleration (or vibration displacement) for generating the same sensory vibration force as the sensory vibration force at the reference frequency in each frequency driving condition based on the standard actuator. At operation 811, the processor 410 may calculate the ratio Rh between the vibration acceleration for each frequency and the vibration acceleration of the reference frequency.

At operation 813, the processor 410 may store the Rb value calculated at operation 807 and the Rh value calculated at operation 811 in the memory 430. According to various embodiments of the disclosure, the Rb value that is data for the actuator and the Rh value that is data for the human receptor may be stored in the memory 430 in the form of a table.

TABLE 2

| Frequency | Back EMF voltage by motor | Weighting Factor by receptor | Scale factor |
| --- | --- | --- | --- |
| f1 | V_back(@f1) | Rh(@f1) | Sc(@f1) |
| f2 | V_back(@f2) | Rh(@f2) | Sc(@f2) |
| ... | ... | ... | ... |
| fn | V_back(@fn) | Rh(@fn) | Sc(@fn) |

Table 2 as described above illustrates a ratio of the back EMF value for each frequency to the vibration acceleration of the human receptor. The processor may calculate the driving voltage of the actuator based on data in Table 2 as above ((@fi)=[Rb(@fi)*Rh(@fi)]*Sc(@fi)*Standard Voltage, Rb(@fi)=V_back(@fo)/V_back(@fi)).

Operations 813 to 821 are similar to operations 501 to 507 as described above. At operation 817, the processor 410 may detect a haptic generation event, and in response to the haptic generation event, the processor 410, at operation 817, may calculate Rb*Rh according to the frequency (for each frequency). At operation 819, the processor 410 may calculate the driving voltage to be applied to the actuator (driving voltage=reference voltage*(Rb*Rh). For example, the processor 410 may acquire the back EMF value (voltage) by applying the same voltage for each frequency. The processor 410 may determine the multiple Rb to reach a target value, and it may determine the driving voltage for each frequency by multiplying the multiple Rb by the Rh value (value related to the frequency characteristic of the human receptor) for each frequency and a scale vector. At operation 821, the processor 410 may drive the actuator with the calculated driving voltage. The processor 410 may generate the vibration by driving the actuator.

Although not illustrated, according to various embodiments of the disclosure, a feedback circuit may be used without obtaining the Rb value for the actuator as described above. The processor 410 according to various embodiments may monitor the back EMF for an input voltage for each frequency, adjust the voltage to reach the reference back EMF (the back EMF measured when the reference voltage is applied at the resonant frequency), and store the adjusted voltage value in the memory 430 in the form of a table. For example, if it is assumed that an input voltage at a reference frequency f_s is V_in, the processor 410 may acquire a reference back EMF value BV_back_s measured by applying the reference voltage. The processor 410 may calculate a feedback voltage value Vfb(@fi,V_in) so that the back EMF value BV_back at the driving frequency fi reaches the reference back EMF value through adjustment of the input voltage Vop at the driving frequency fi. The processor 410 may calculate the feedback voltage value using the feedback circuit, and it may store the feedback voltage value in the memory 430.

TABLE 3

| Frequency | Feedback Voltage | Weighting Factor by receptor |
| --- | --- | --- |
| f1 | Vfb(@f1 ,V_in) | Rh(@f1) |
| F2 | Vfb(@f2,V_in) | Rh(@f2) |
| ... | ... | ... |
| fn | Vfb(@fn,V_in) | Rh(@fn) |

Table 3 as described above illustrates a ratio of a feedback voltage value for each frequency to a vibration acceleration of a human receptor. With reference to Table 3, the processor 410 may store the feedback voltage value in the memory 430 in the form of a table. Further, the processor 410 may also store the ratio of vibration acceleration for each frequency in the form of a table based on the human receptor.

According to various embodiments, if a haptic generation event at a specific frequency is detected, the processor 430 may calculate the driving voltage by multiplying the feedback voltage value stored for each frequency in the memory 430 by the Rh value (data for human receptor), and it may drive the actuator with the driving voltage. According to the above-described embodiments, the driving voltage may be calculated by multiplying the feedback voltage value by the Rh value (Driving voltage (@fi)=Rh(@fi)*Feedback Voltage(@fi,V_in)).

Further, although not illustrated, the electronic device 400 according to various embodiments of the disclosure may directly calculate the driving voltage value (e.g., equal sensory voltage) so as to generate haptic vibrations with the same intensity. The processor 410 of the electronic device 400 may drive the actuator for each frequency fi, and it may adjust the driving voltage V_hand(@fi) so that the same haptic vibration intensity as the reference vibration force (vibration intensity) at the resonant frequency fo is sensed. The processor 410 may store the adjusted driving voltage in the memory 430 in the form of a table.

TABLE 4

| Frequency | Equal sensory voltage (Voltage value whereby the same vibration force is sensed) |
| --- | --- |
| f1 | V_hand(@f1) |
| f2 | V_hand(@f2) |
| ... | ... |
| fn | V_hand(@fn) |

Table 4 as described above illustrates the equal sensory voltage for each frequency. According to various embodiments of the disclosure, if a haptic generation event is detected, the electronic device 400 may identify the equal sensory voltage value stored in the memory 430, and it may drive the actuator with the identified equal sensory voltage value. The electronic device 400 may generate the haptic vibration by driving the actuator. By driving the actuator with the equal sensory voltage value, the electronic device 400 may provide the haptic vibration with the same sensory vibration intensity to the user regardless of the frequency.

Although not illustrated, the electronic device 400 according to various embodiments of the disclosure may measure a displacement value of a vibrator using a hall sensor (sensor using a current difference between a current and a voltage that is generated in a vertical direction to the current and a magnetic field when the magnetic field is applied to a conductor through which the current flows). The vibrator may be deployed as a moving structure hanging from a spring inside the motor of the electronic device 400. A magnet may be attached to the vibrator. The electronic device 400 may measure the displacement value of the vibrator using the hall sensor. The electronic device 400 may calculate the ratio of the measured displacement value of the vibrator to the configured reference displacement, and it may determine the driving voltage of the actuator based on the calculated displacement ratio. The electronic device may store the measured displacement value of the vibrator in the memory 430.

Figure 9:
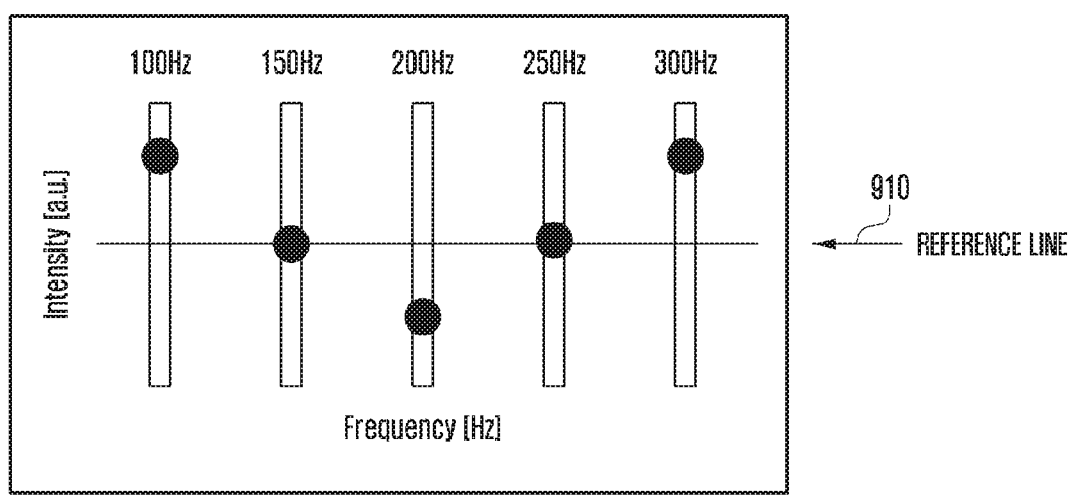
FIG. 9 is an exemplary diagram illustrating a user interface for a user to configure a vibration intensity for an actuator according to various embodiments of the disclosure.

FIG. 9 is an exemplary diagram illustrating a user interface for a user to configure a vibration intensity for an actuator according to various embodiments of the disclosure.

With reference to FIG. 9, the electronic device 400 according to various embodiments may configure the intensity of haptic vibration for each frequency by a user. FIG. 9 is an exemplary diagram of a user interface (UI) displayed through the display 450 of the electronic device 400. With reference to FIG. 9, the electronic device 400 may display a reference line through the user interface, and it may configure the intensity of the haptic vibration generated for each frequency by a user's input. The reference line 910 may be configured as a driving voltage of the actuator, or it may be configured as an equal sensory voltage value (driving voltage for each frequency having the same sensory vibration intensity regardless of the frequency). With reference to FIG. 9, the electronic device 400 may generate haptic vibration that is stronger than the reference vibration force at 100 Hz and 150 Hz, and it may generate the haptic vibration that is weaker than the reference vibration force at 200 Hz. In other words, the electronic device 400 may heighten the intensity of the haptic vibration by increasing the driving voltage of the actuator at the frequency of 100 to 150 Hz. The electronic device 400 may relatively lower the intensity of the haptic vibration by reducing the driving voltage of the actuator at the frequency of 200 Hz. According to various embodiments, the electronic device 400 may adjust the intensity of the haptic vibration for each frequency by the user's configuration. The user interface may be displayed through the display 450 of the electronic device, and the processor 410 of the electronic device 400 may receive the user's input (e.g., touch input or button input), and it may differently configure the intensity of the haptic vibration for each frequency.

According to various embodiments, the processor 410 may provide the intensity of the haptic vibration preferred by the user by configuring the vibration intensity of the haptic vibration for each frequency. The user can configure the vibration intensity for each frequency in accordance with the user's taste, and thus the user can be provided with a feedback specified to the user.

According to various embodiments, the processor 410 may configure a threshold value for each frequency in order to differently configure the vibration intensity of the haptic vibration for each frequency. The processor may calculate the driving voltage of the actuator based on data of the actuator and data of the human receptor, and it may compare the calculated driving voltage with the configured threshold value. The processor 410 may determine the driving voltage based on the result of the comparison, and it may drive the actuator with the determined driving voltage. The above-described threshold value may be the driving voltage of the actuator corresponding to the vibration intensity configured by the user for each frequency.

According to various embodiments of the disclosure, various configurations are possible in addition to the above-described method. A process of differently configuring the driving voltage for each frequency by various methods performed by the user may be included in implementation of the concept of the disclosure.

According to various embodiments of the disclosure, a method for controlling an actuator may include detecting a haptic generation event through a sensor circuitry; identifying data of the actuator and data of a human receptor stored in a memory in response to the haptic generation event; calculating a driving voltage of the actuator based on the identified data of the actuator and the identified data of the human receptor; and driving the actuator with the calculated driving voltage.

According to various embodiments of the disclosure, the method for controlling the actuator may further include collecting the data of the actuator and the data of the human receptor for haptic vibration, and storing the collected data of the actuator and the collected data of the human receptor in the memory.

According to various embodiments of the disclosure, collecting the data of the actuator may include identifying a reference voltage at a resonant frequency based on the actuator, applying the reference voltage to the actuator for each frequency, and collecting the data of the actuator for the haptic vibration.

According to various embodiments of the disclosure, collecting the data of the human receptor may include collecting the data of the human receptor for each frequency using a standard actuator.

According to various embodiments of the disclosure, collecting the data of the actuator may include applying a voltage for a predetermined period to the actuator for each frequency based on the actuator, measuring a back electromotive force generated if the voltage is blocked, calculating a ratio of the measured back electromotive force to a reference back electromotive force, and collecting the ratio of the calculated back electromotive force.

According to various embodiments of the disclosure, collecting the data of the actuator may include applying a voltage for a predetermined period to the actuator for each frequency based on the actuator, measuring a displacement of a vibrator using a hall sensor in the case of applying the voltage, calculating a ratio of the measured displacement of the vibrator to a reference displacement, and collecting the calculated ratio of the displacement.

According to various embodiments of the disclosure, collecting the data of the actuator may include measuring a reference vibration acceleration implementing the same intensity as a vibration intensity of a reference frequency using a standard actuator, calculating a ratio between the vibration acceleration measured for each frequency and the reference vibration acceleration, and collecting the calculated ratio of the vibration acceleration.

According to various embodiments of the disclosure, the method for controlling the actuator may further include calculating the driving voltage for driving the actuator based on the calculated back electromotive force ratio, the calculated displacement ratio, or the calculated acceleration ratio, and driving the actuator with the calculated driving voltage.

According to various embodiments of the disclosure, the method for controlling the actuator may further include adjusting the driving voltage of the actuator by user's configuration.

According to various embodiments of the disclosure, a method for controlling an actuator may include detecting a haptic generation event through a sensor circuitry; identifying data of the actuator and data of a human receptor stored in a memory in response to the haptic generation event; calculating a driving voltage of the actuator based on the identified data of the actuator and the identified data of the human receptor; comparing the calculated driving voltage with a configured threshold value; and driving the actuator with the driving voltage determined based on the result of the comparison.

The term "module" as used herein may include a unit consisting of hardware, software, or firmware, and may, for example, be used interchangeably with the term "logic", "logical block", "component", "circuit", or the like. The "module" may be an integrated component or a minimum unit for performing one or more functions or a part thereof.

The "module" may be implemented mechanically or electronically, and may include, for example, an Application-Specific Integrated Circuit (ASIC) chip, a Field-Programmable Gate Array (FPGA), or a programmable logic device, which is known or is to be developed in the future, for performing certain operations.

At least some of devices (e.g., modules or functions thereof) or methods (e.g., operations) according to various embodiments may be implemented as instructions which are stored a computer-readable storage medium (e.g., the memory 130) in the form of a program module. If the instructions are executed by a processor, the processor may perform a function corresponding to the instructions.

The computer-readable storage medium may include a hard disk, a floppy disk, a magnetic medium (e.g., a magnetic tape), optical media (e.g., CD-ROM, DVD), magneto-optical media (e.g., a floptical disk), internal memory, etc. The instructions may include code compiled by a complier or code that can be executed by an interpreter.

The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

What is claimed is:

1. An electronic device comprising:
   an actuator;
   a sensor circuitry;
   a memory; and
   a processor electrically connected to the actuator, the sensor circuitry, and the memory,
   wherein the processor is configured to:
      apply a voltage for a predetermined period to the actuator for each frequency based on the actuator,
      measure a back electromotive force generated if the voltage is blocked, and calculate a first ratio between the measured back electromotive force and a reference back electromotive force,
      measure a reference vibration acceleration implementing the same intensity as a vibration intensity of a reference frequency using a standard actuator, and calculate a second ratio between the vibration acceleration measured for each frequency and the reference vibration acceleration,
      store the first ratio as data of the actuator and the second ratio as data of a human receptor in the memory,
      detect a haptic generation event through the sensor circuitry,
      identify the data of the actuator and the data of the human receptor stored in the memory in response to the haptic generation event,
      calculate a driving voltage of the actuator based on the identified data of the actuator and the identified data of the human receptor, and
      drive the actuator with the calculated driving voltage,
   wherein the data of the actuator comprises information on a vibration intensity of a haptic vibration generated for each frequency.

2. The electronic device of claim 1, wherein the processor is further configured to:
   collect the data of the actuator and the data of the human receptor for haptic vibration, and
   store the collected data of the actuator and the collected data of the human receptor in the memory.

3. The electronic device of claim 2, wherein the processor is further configured to:
   identify a reference voltage at a resonant frequency based on the actuator, to apply the reference voltage to the actuator for each frequency,
   acquire the data of the actuator for the haptic vibration, and
   store the acquired data of the actuator in the memory.

4. The electronic device of claim 2, wherein the processor is further configured to:
   apply a voltage for a predetermined period to the actuator for each frequency based on the actuator, and
   measure a displacement of a vibrator using a hall sensor in the case of applying the voltage, calculate a ratio of the measured displacement of the vibrator to a reference displacement, and store the calculated ratio of the displacement in the memory.

5. The electronic device of claim 4, wherein the processor is further configured to:
   calculate the driving voltage for driving the actuator based on the calculated back electromotive force ratio, the calculated displacement ratio, or the calculated acceleration ratio, and
   drive the actuator with the calculated driving voltage.

6. The electronic device of claim 1,
   wherein the data of the human receptor is data quantifying a user's feeling degree for each frequency with respect to a vibration intensity of haptic vibration generated through the actuator, and
   wherein the driving voltage of the actuator is adjusted by user's configuration.

7. The electronic device of claim 1, further comprising:
   a display; and
   audio circuitry,
   wherein the processor is further configured to detect the haptic generation event based on the display and the audio circuitry.

8. The electronic device of claim 1,
   wherein the processor is further configured to:
      compare the calculated driving voltage of the actuator with a configured threshold value, and
      drive the actuator with the driving voltage determined based on the result of the comparison, and
   wherein the threshold value is the driving voltage of the actuator corresponding to a vibration intensity configured by a user for each frequency.

9. A method for controlling an actuator comprising:
   applying a voltage for a predetermined period to the actuator for each frequency based on the actuator;
   measuring a back electromotive force generated if the voltage is blocked, and calculate a first ratio between the measured back electromotive force and a reference back electromotive force;
   measuring a reference vibration acceleration implementing the same intensity as a vibration intensity of a reference frequency using a standard actuator, and calculate a second ratio between the vibration acceleration measured for each frequency and the reference vibration acceleration;
   storing the first ratio as data of the actuator and the second ratio as data of a human receptor in a memory;
   detecting a haptic generation event through a sensor circuitry;

identifying the data of the actuator and the data of the human receptor stored in a memory in response to the haptic generation event;

calculating a driving voltage of the actuator based on the identified data of the actuator and the identified data of the human receptor; and driving the actuator with the calculated driving voltage, wherein the data of the actuator comprises information on a vibration intensity of a haptic vibration generated for each frequency.

10. The method of claim 9, further comprising:

collecting the data of the actuator and the data of the human receptor for haptic vibration; and storing the collected data of the actuator and the collected data of the human receptor in the memory.

11. The method of claim 10, wherein collecting the data of the actuator comprises:

identifying a reference voltage at a resonant frequency based on the actuator;

applying the reference voltage to the actuator for each frequency; and collecting the data of the actuator for the haptic vibration.

12. The method of claim 10, wherein collecting the data of the actuator comprises:

applying a voltage for a predetermined period to the actuator for each frequency based on the actuator;

measuring a displacement of a vibrator using a hall sensor in the case of applying the voltage;

calculating a ratio of the measured displacement of the vibrator to a reference displacement; and collecting the calculated ratio of the displacement.

13. The method of claim 9, further comprising:

comparing the calculated driving voltage with a configured threshold value; and driving the actuator with the driving voltage determined based on the result of the comparison.

14. The method of claim 13, wherein the threshold value is the driving voltage of the actuator corresponding to a vibration intensity configured by a user for each frequency.

15. The method of claim 9, wherein the data of the actuator and the data of the human receptor is stored in the memory prior to the haptic generation event.

* * * * *